United States Patent [19]

Stevens et al.

[11] 4,077,991

[45] Mar. 7, 1978

[54] COPOLYMERS OF GLYCIDOL AND GLYCIDYL ESTERS

[75] Inventors: Violete L. Stevens; Arthur R. Sexton, both of Midland, Mich.; Frederick P. Corson, Sudbury, Mass.

[73] Assignee: The Dow Chemical Company, Midland, Mich.

[21] Appl. No.: 633,539

[22] Filed: Nov. 19, 1975

Related U.S. Application Data

[63] Continuation-in-part of Ser. No. 466,099, May 2, 1974, abandoned.

[51] Int. Cl.² .......................... C08H 3/00; C09F 7/06
[52] U.S. Cl. ....................................... 260/407; 260/2;
260/18 EP; 260/22 EP; 260/47 EQ; 260/76;
260/78.41; 260/408; 260/410.6; 260/404.8;
526/56; 526/317; 526/332; 526/333; 560/198
[58] Field of Search ............ 260/410.6, 488 J, 486 R,
260/475 P, 485 G, 404.8, 407, 22 EP, 18 EP, 2
BP, 47 EQ, 76, 78.41; 526/56, 317, 332, 333

[56] References Cited

U.S. PATENT DOCUMENTS

| | | |
|---|---|---|
| 2,260,753 | 10/1941 | Marple et al. ...................... 260/488 J |
| 2,652,421 | 9/1953 | De Groote ...................... 260/485 G |
| 2,695,915 | 11/1954 | De Groote ...................... 260/486 R |
| 3,578,719 | 5/1971 | Kalopissis et al. ............ 260/410.6 X |
| 4,014,854 | 3/1977 | Stevens et al. .................. 260/18 EP |

FOREIGN PATENT DOCUMENTS

| | | |
|---|---|---|
| 464,163 | 4/1950 | Canada .............................. 260/410.6 |
| 509,113 | 1/1955 | Canada .............................. 260/410.6 |
| 1,154,228 | 6/1969 | United Kingdom .............. 260/410.6 |
| 1,267,259 | 3/1972 | United Kingdom .............. 260/410.6 |

*Primary Examiner*—Winston A. Douglas
*Assistant Examiner*—John F. Niebling
*Attorney, Agent, or Firm*—C. E. Rehberg; David H. Fifield

[57] ABSTRACT

New polymers are copolymers of glycidol, glycidyl esters of fatty acids, and, optionally, alkylene oxides. They are conveniently made by the reaction of a fatty acid with a polymer or copolymer of tert.-butyl glycidyl ether in the presence of an acid catalyst. They are useful as coatings, lubricants, plasticizers, textile antistatic agents and surfactants.

8 Claims, No Drawings

COPOLYMERS OF GLYCIDOL AND GLYCIDYL ESTERS

CROSS-REFERENCE TO RELATED APPLICATION

This application is a continuation-in-part of our copending application filed May 2, 1974, Ser. No. 466,099 now abandoned.

BACKGROUND OF THE INVENTION

U.S. Pat. No. 3,446,757, issued to Edwin J. Vandenberg, discloses the homopolymerization and copolymerization of silicon esters of glycidol followed by hydrolysis to remove the esterifying group, thus producing homopolymers and copolymers of glycidol. The latter may then be cross-linked by reaction with a polyfunctional acid, anhydride, isocyanate or epoxide.

U.S. Pat. Nos. 3,578,719; 3,595,924 and 3,666,671, issued to Kalopissis and Vanlerberghe, disclose the "hydroxylation" of homopolymers or copolymers of epichlorohydrin by the reaction of potassium acetate and a glycol with the polymers. Small, incidental amounts of acetylated material are also thereby formed and are hydrolyzed in a subsequent step.

Vanlerberghe, British Pat. No. 1,267,259, discloses the dealkylation of polymers of tert.-butyl glycidyl ether by heating them with water and a sulfonic acid. The resulting polyglycidols may then be esterified by conventional means.

SUMMARY OF THE INVENTION

The invention comprises new compounds of the formula $$R[(R'O)_m X]_n$$

wherein R is the residue left by the removal of n active hydrogen atoms from an initiator compound, $RH_n$; each R' independently is an alkylene radical selected from the group consisting of ethylene, trimethylene, tetramethylene, 1,2-butylene, 2,2-bis(halomethyl)-1,3-propylene, phenylethylene and groups of the formula

—$CH_2CHCH_2A$ each A independently is H, Cl, Br, or OX; each X independently is H or the acyl radical of a carboxylic acid free of α,β-unsaturation with the proviso that at least one R' is 3-hydroxy-1,2-propylene and at least one is a group of the formula

—$CH_2CHCH_2OX$ wherein X is the acyl radical of a fatty acid comprised of at least three, preferably at least four, carbon atoms and free of α,β-unsaturation and m and n are integers such that the total number of R'O groups is at least 2.

Compounds of the above formula are conveniently made by acylating the desired proportion of the hydroxyl groups in a polymer or copolymer of glycidol, said polymer or copolymer being initiated by the initiator $RH_n$. Methods for preparing such intermediates are described in the references cited above and in U.S. Pat. No. 3,446,756 and British Pat. No. 1,267,259.

In the preferred method of making the compounds of the invention, tert.-butyl glycidyl ether (TBGE) optionally to combination with one or more alkylene oxides of the formula R'O as defined above, is condensed by known methods with the initiator compound, $RH_n$. In a second step, the resulting polymer is simultaneously debutylated and, to the desired extent, esterified by being heated in the presence of the appropriate carboxylic acid, anhydride or acyl halide and a catalytic amount of a strong acid catalyst, preferably a sulfonic acid.

The compounds of the invention are oily liquids or semisolids which are useful as coating materials, lubricants, plasticizers, textile antistatic agents and surfactants. This wide range of utilities is made possible by the fact that the compounds can be "tailor-made" within broad limits of structure and properties. Thus, by varying the number of free hydroxyl groups and the number and carbon chain length of the acyl groups, the hydrophobic-hydrophylic balance can be adjusted to any desired value, thus providing a wide range of surfactants useful as emulsifiers and wetting agents. Those compounds having a multiplicity of fatty acyl groups of up to about ten carbon atoms are preferred for use as softeners and lubricants for leather, textiles, paper and the like and as plasticizers for cellulose ether resins. Those having fatty acyl groups of about eight to twenty or more carbon atoms are useful as lubricants and antistatic agents for polyvinyl chloride resins and polyester and polyamide films and fibers. Those compounds having a plurality of free hydroxyl groups are useful as intermediates for making polymerizeable vinyl monomers by esterification with an acid having a polymerizable vinyl group, such as acrylic, methacrylic, chloroacrylic, cyanoacrylic, maleic and itaconic acids. The resultant esters are polymerizable by free radical initiators to produce resins useful as coatings and for molding or casting solid objects.

DETAILED DESCRIPTION OF THE INVENTION

The preferred compounds of the invention are those of the above formula wherein R has a valence of 1-8 and is the residue of a hydroxy compound free of groups reactive with alkylene oxides other than alcoholic hydroxyl groups. Suitable such compounds include the alkanols, such as methanol, butanol, octanol, dodecanol and octadecanol; the alkenols, such as allyl alcohol, 10-undecen-1-ol, oleyl alcohol, and the like; alkylene glycols, such as ethylene, propylene, butylene, 1,4-tetramethylene and 1,3-hexylene glycols; the higher aliphatic polyols such as glycerol, pentaerythritol, sorbitol, sucrose, hexanetriol and the like; phenols, such as phenol, cresols, xylenols, hydroquinone, resorcinol, naphthols, and the like; and aralkanols, such as benzyl alcohol and phenethyl alcohol, and the like. It is preferred that the initiator have not more than 8 active hydrogen atoms, and preferably not more than 3. Especially preferred initiators are water and the glycols. Water reacts with alkylene oxides or tert.-butyl glycidyl ether (TBGE) to open the oxirane ring, thus producing a glycol which may then be regarded as a glycol initiator prepared in situ. Analogous reactions take place with oxetanes and tetrahydrofurans.

The polymer or copolymer of glycidol that can be used to make the compounds of the invention may be made in any convenient manner. For instance, a polymer of TBGE or a copolymer thereof with one or more alkylene oxides may be made by the polymerization of the monomers, as described in U.S. Pat. No. 3,519,559. The tert.-butyl groups may then be removed by warming the material in the presence of an arylsulfonic acid, as is shown in British Pat. No. 1,267,259, thus replacing the tert.-butoxy groups with hydroxy groups. Any desired proportion of the latter can then be esterified with the carboxylic acid. The terminal hydroxyls may be likewise esterified.

In a preferred method, TBGE, in conjunction with one or more alkylene oxides if desired, is condensed with an initiator compound (which may be the moisture incidentally present in the reactants and/or apparatus), and then the tert.-butoxy groups are removed and the desired proportion of ester groups are simultaneously attached by warming the polymer with an arysulfonic acid or similar catalyst in the presence of sufficient carboxylic acid or anhydride to produce the desired proportion of ester groups.

If any substantial part of the acid to be used in the esterification step is a polycarboxylic acid, it is preferably used in the form of its anhydride and in the proportion of one mole of anhydride per equivalent of hydroxyl to be esterified, thus producing a partial ester of the acid. If one attempts to totally esterify such an acid, its polyfunctionality causes branching and, ultimately, cross-linking of the substrate. Moreover, because of the likelihood of transesterification and resultant crosslinkage, the polycarboxylic acid anhydride preferably should be reacted separately and only after the reaction of any monocarboxylic acid unless the latter too is used only in the form of its anhydride. In the latter instance the anhydrides may be mixed and reacted simultaneously and the byproduct monocarboxylic acid subsequently removed under conditions that avoid further esterification of the partial esters of the polycarboxylic acids.

Suitable monocarboxylic acids for use in practicing the invention include the fatty acids, such as, propionic, butyric, octanoic, oleic and stearic, and aromatic acids, such as benzoic and naphthoic acids. Suitable polycarboxylic acid anhydrides include those of succinic, adipic, phthalic, trimellitic and hemimellitic acids and the corresponding alkyl- and halo-substituted compounds.

Since all practical methods for making the compounds of the invention involve a condensation polymerization of the initiator compound with a glycidyl compound (substituted alkylene oxide), one or more other cyclic ethers can be copolymerized with the glycidyl compound in this step. Suitable such ethers include ethylene, propylene, butylene and styrene oxides, epichlorohydrin, tetrahydrofuran, oxetane, 2,2-bis(halomethyl)oxetane and the like. Such copolymers may be heteric (random), wherein the monomers were reacted simultaneously, or they may be block copolymers, wherein the monomers were reacted sequentially in any desired sequence and proportions. The number of oxyalkylene units in the polymer chains (m in the above formula) may vary from two to many thousands, depending on the monomers and catalyst used in its preparation.

SPECIFIC EMBODIMENTS OF THE INVENTION

The following examples illustrate the practice of the invention.

A. Preparation of TBGE Polymers and Copolymers

Monomeric tert.-butyl glycidyl ether (TBGE) was homopolymerized or copolymerized in various proportions with other cyclic ethers in known manner, the products and their preparation being summarized in Table I. The indicated initiators were the active hydrogen compounds used to initiate the polymer chains. In all runs, the reaction was continued until all TBGE and other alkylene oxides fed to the reactor had reacted, thus assuring that the molar proportions in the product were the same as in the reactor feed. Molecular weights of the products were estimated by the acetic anhydride method, based on the expected number of hydroxyl groups per molecule.

TABLE I

| Run No. | Initiator[a] | Catalyst | Monomer, Mole % TBGE | Monomer, Mole % Other[b] | Molecular Wt. of Product | Monomer Units Per Mole TBGE | Monomer Units Per Mole Other |
|---|---|---|---|---|---|---|---|
| 1 | $H_2O$ | $BF_3$ | 100 | 0 | 1000 | 7.7 | 0 |
| 2 | TEG | Na | 100 | 0 | 6150 | 46 | 3 |
| 3 | EG | $BF_3$ | 100 | 0 | 1000 | 7.2 | 1 |
| 4 | $H_2O$ | KOH | 33 | PO,67 | 996 | 4.0 | 7.9 |
| 5 | $H_2O$ | KOH | 25 | EO,75 | 5000 | 19.0 | 57.3 |
| 6 | $H_2O$ | KOH | 50 | EO,50 | 5100 | 29.3 | 29.3 |
| 7 | PG | KOH | 14 | PO,86 | 1970 | 4.0 | 25.0 9.8 BO |
| 8 | EG | KOH | 13 | PO,48;BO,39 | 1820 | 3.1 | 12.1 PO |
| 9 | EG | KOH | 25 | EO,75 | 20,000 | 76.3 | 229 |
| 10 | Gly | KOH | 25 | EO,75 | 1100 | 3.9 | 11.5 |
| 11 | $H_2O$ | KOH | 10 | EO,90 | 5000 | 9.5 | 85.6 |
| 12 | $H_2O$ | KOH | 5 | EO,95 | 6000 | 6.2 | 118 |
| 13 | $CH_3OH$ | $BF_3$ | 100 | 0 | 700 | 5.1 | 0 |
| 14 | EG | KOH | 75 | EO,25 | 1000 | 6.5 | 3.2 |

[a]EG, PG and TEG are ethylene, propylene and triethylene glycols, respectively, and Gly is glycerol.
[b]EO, PO and BO are ethylene, propylene and butylene oxides, respectively.

B. Dealkylation and Esterification of the Polymers Listed in Table I

The polymers of Table I have n terminal hydroxyl groups, where n is the functionality of the initiator $RH_n$. These hydroxyl groups can be esterified without disturbing the tert.-butoxy groups by reaction with an acid anhydride or, in the presence of a base, by use of an acyl halide. Attempts to esterify them with carboxylic acids in the presence of strong acid catalysts result in dealkylation (loss of isobutylene) together with esterification of the resultant primary hydroxyl groups. Thus, a particular feature of this invention is the discovery that the TBGE polymers and copolymers can be terminally esterified independently of the tert.-butoxy groups and that the latter groups can be simultaneously and in a single step dealkylated and, to any desired extent, esterified by reaction with a carboxylic acid. The latter reactions are catalyzed by strong acid catalysts, especially the arylsulfonic acids.

Esterification of the terminal hydroxyl groups of the tert.-butyl ether polymers and copolymers by use of acyl halides or half-esterification of dicarboxylic acid anhydrides can be accomplished under mild conditions, such as 30°–90° C., whereas dealkylation and/or esterification with carboxylic acids requires acid catalysis and temperatures of about 100° or more for a convenient rate of reaction. Temperatures of about 125°–150° are preferred. The progress of the reactions can be followed by measuring the amount of isobutylene and/or water produced. Removal of water can be facilitated by use of a solvent, such as toluene, that refluxes at a convenient temperature and forms an azeotrope with water. Since the desired final products have some unesterified hydroxyl content, this is usually assured by putting into the reaction mixture the amount of acid or anhydride that is needed to esterify the desired proportion, though it is also possible to use excess acid, follow the esterification by monitoring the amount of water produced, and stop the reaction at the desired point. Removal of isobutylene and/or water may be facilitated by sparging a slow stream of inert gas through the reaction mixture during the reaction.

Table II summarizes the results of a series of experiments wherein the polymers listed in Table I were dealkylated and partially esterified as described above. The starting material is identified by the Run No. as shown in Table I. The amounts of acids used in the esterification reactions are shown as moles/mole of starting material.

In Table II the products are characterized by the number of acyl groups and the number of primary hydroxyl groups (glycidol units) per molecule of the product. The ester groups were determined by NMR and the hydroxyl groups were determined by reaction with trifluoroacetic acid, all calculations being based on the molecular weights shown in Table I.

even if on average only a small proportion, such as 10%, of the molecules contain the primary hydroxyl groups.

The utility as surfactants of several typically compounds of the invention is illustrated by the following series of experiments.

A commerical clay powder was coated with 0.1% by wt. of the compound to be tested and the wetting time of the clay was then determined. In this test the wetting time was the time required for a sample of the clay to sink to the bottom of a 1-liter graduated cylinder containing 1 liter of water, the time being measured from when the clay was placed on the surface of the water.

Results are summarized in the following table. The compounds are identified by the Run No. assigned to them in Table II.

TABLE III

| Run No. | Compound No. From Table II | Wetting Time, sec. |
|---|---|---|
| 44 | 25 | 5 |
| 45 | 26 | 4 |
| 46 | 29 | 4 |
| 47 | 30 | 3 |
| 48 | 33 | 3 |
| 49 | None | 25 |

By virtue of their free hydroxyl groups, the compounds of the invention are reactive with, and readily cross-linkable by, polyfunctional compounds reactive with hydroxyl groups, such as formaldehyde, glyoxal, organic polyisocyanates, and the like. By use of such curing agents, curable coatings can be applied to various substrates and then cured in place to provide firmly

TABLE II

| Run No. | Starting Material Table I - Run No. | Acylating Agent Moles/Mole | | Product, Units/Mole | |
|---|---|---|---|---|---|
| | | | | Ester Groups | Primary OH Gps. |
| 15 | 1 | Stearic a. | 1.0 | 1.0 | 6.7 |
| 16 | 1 | " | 4.8 | 4.8 | 2.9 |
| 17 | 1 | " | 7.3 | 7.3 | .4 |
| 18 | 2 | " | 9.2 | 9.2 | 36.8 |
| 19 | 2 | " | 27.6 | 27.6 | 18.4 |
| 20 | 3 | " | 4.1 | 4.1 | 3.1 |
| 21 | 4 | phthalic anhyd. | 2.5 | 2.5 | 2.3 |
| 22 | 5 | Stearic a. | 4.0 | 4.0 | 15.0 |
| 23 | 5 | " | 1.5 | 1.5 | 17.5 |
| 24 | 6 | " | 1.6 | 1.6 | 27.7 |
| 25 | 6 | " | 4.0 | 4.0 | 25.3 |
| 26 | 6 | " | 15.5 | 15.5 | 13.8 |
| 27 | 6 | " | 23.0 | 23.0 | 6.3 |
| 28 | 6 | Lauric | 1.6 | 1.6 | 27.7 |
| 29 | 6 | " | 7.7 | 7.7 | 21.6 |
| 30 | 6 | " | 15.5 | 15.5 | 13.8 |
| 31 | 6 | " | 23.0 | 23.0 | 6.3 |
| 32 | 7 | Stearic | 1.5 | 1.5 | 2.5 |
| 33 | 7 | Lauric | 1.5 | 1.5 | 2.5 |
| 34 | 7 | Oleic | 1.5 | 1.5 | 2.5 |
| 35 | 7 | Octanoic | 1.5 | 1.5 | 2.5 |
| 36 | 8 | Stearic | 1.5 | 1.5 | 2.6 |
| 37 | 9 | Stearic | 5.8 | 5.8 | 70.5 |
| 38 | 9 | FA-2[a] | 13.3 | 13.3 | 63.0 |
| 39 | 10 | " | 1.0 | 1.0 | 2.8 |
| 40 | 11 | " | 1.0 | 1.0 | 8.5 |
| 41 | 12 | " | 1.0 | 1.0 | 5.2 |

[a]FA-2 is a commerical mixture of natural fatty acids

The esters shown in Table II were oily liquids or solids, depending on molecular weight and functionality. Mose were readily soluble in most organic solvents and some were soluble to slightly soluble in water.

The products shown in Table II are not pure compounds, but rather are mixtures having the average compositions shown. Where the number of primary hydroxyl groups is less than one, this signifies that some molecules contain such a group while others do not. It has been found that the advantageous properties and utilities of the product are often present in such mixtures adherent, solvent-resistant coatings. Such techniques are illustrated by the following examples.

The compounds used are identified by their Run No. as shown in Table II. In each experiment the compound was mixed with the indicated percentage by weight of hexakis(methoxy-methyl)melamine, sold commercially under the trade name Cymel 303. The compositions were then applied to aluminum plates and cured by placing the plates in an oven at 180° C. for 5 min. The cured coatings were smooth and strongly adherent. Immersion in water for 1 hour showed no loss of adhesion or other visible effect. Resistance to organic solvents was indicated by wetting the surface with methyl ethyl ketone (MEK) and rubbing it with a finger until visible loosening, tearing or other impairment of the film was observed. Results are tabulated in Table IV.

TABLE IV

| Run No. | Compound Run No., Table II | % Cymel 303 | No. Rubs in MEK |
|---|---|---|---|
| 50 | 32 | 21 | 24 |
| 51 | 33 | 22 | >100 |
| 52 | 35 | 22 | >100 |
| 53 | 34 | 21 | 18 |
| 54 | 36 | 24 | 24 |

A polymer of the type described in Table I was prepared using KOH catalyst, with water as the initiator, by contacting TBGE and EO in a mole ratio of 60:40. The product was thereafter completely dealkylated to give a polymer of about 1500 molecular weight. This dealkylated polymer was then esterified as in part B, above, to varying degrees with a variety of fatty acids ranging from 2 to 18 carbons atoms. The degree of esterification was controlled by the amount of acid added so that the esterified products all had about the same calculated HLB number, 13.6. The HLB number was calculated as follows:

$$HLB = \frac{\text{weight (oxyethylene units + glycidol units)}}{\text{weight of esterified product}} \times 20$$

These esterified products were then tested as 0.1 wt.% aqueous solutions to measure the effect that varying the chain length of the fatty acid portion has on surface tension and wetting time. Surface tension was measured on a Cenco-Dunouy surface tensiometer at about 25° C. Wetting time was determined by a modified Draves-Clarkson wetting test.

The wetting test was carried out by attaching a 6 inch length of Synthron wetting tape (supplied by U.S. Testing Co., Inc.), with a 0.705 g hook made of copper wire, to a 3 inch length of 2-ply cotton yarn which in turn was attached to a 20 g weight. A 500 ml graduated cylinder was filled with a 0.1 wt.% aqueous (deionized water) solution of the esterified product to be tested. This assembly was dropped vertically, weighted-end down, into the filled cylinder and a stop watch started when the weight hit the bottom, the Synthron wetting tape being totally immersed beneath the liquid surface but suspended by its buoyancy. The timing was stopped when the Synthron wetting tape began to sink toward the bottom at a constant rate, its buoyancy lost due to wetting. This was the "wetting time". The temperature of the wetting solutions was 25°–26° C. As a standard for comparison, pure deionized water at 23° C had a wetting time of 20–25 minutes.

The results of the surface tension and wetting time tests are set forth in Table V.

TABLE V

| Run No. | Esterifying Acid (no. Carbon Atoms) | Surface Tension (Dynes/cm) | Wetting Time (seconds) |
|---|---|---|---|
| 55 | Acetic (2) | 50.0 | 705 |
| 56 | n-propionic (3) | 38.4 | 25 |
| 57 | n-pentanoic (5) | 33.8 | 20 |
| 58 | n-octanoic (8) | 29.8 | 60 |
| 59 | n-decanoic (10) | 30.0 | 60 |
| 60 | Lauric (12) | 31.2 | 120 |
| 61 | Myristic (14) | 32.2 | 185 |
| 62 | Palmitic (16) | 35.2 | 300 |
| 63 | Stearic (18) | 35.8 | 370 |

Still another utility for the compounds of this invention is their use as intermediates for the preparation of the polymerizable unsaturated esters disclosed and claimed in our copending application entitled "Linear Copolymers of Glycidol," filed Feb. 20, 1974, Ser. No. 444,078. In such use, the present compounds are further acylated, but not completely esterified, with a polymerizable $\alpha,\beta$-unsaturated acid, such as acrylic or methacrylic acid.

We claim:
1. A compound of the formula
$R[(R'O)_m X]_n$
wherein R is the residue left by the removal of n active hydrogen atoms from an initiator for alkylene oxide polymerization; each R' independently is an alkylene radical selected from the group consisting of ethylene, trimethylene, tetramethylene, 1,2-butylene, 2,2-bis(halomethyl)-1,3-propylene, phenylethylene and groups of the formula
—$CH_2$ $CHCH_2A$
each A independently is H, Cl, Br, or OX; each X independently is H or the acyl radical of a carboxylic acid free of $\alpha,\beta$-unsaturation
with the proviso that at least one R' is 3-hydroxy-1,2-propylene and at least one is a group of the formula
—$CH_2 CH\ CH_2OX$
wherein X is the acyl radical of a fatty acid comprised of at least three carbon atoms and free of $\alpha,\beta$-unsaturation and
m and n are integers such that the total number of R'O groups is at least 2, n being 1–8.
2. The compound of claim 1 wherein R is the residue of a hydroxy compound free of groups other than OH that are reactive with an alkylene oxide.
3. The compound of claim 2 wherein the hydroxy compound is water or an alkylene glycol.
4. The compound of claim 3 wherein the number of R' groups is at least 10, of which at least 3 are of the formula
—$CH_2 CHCH_2OX$
and about 20–80% of the X' are acyl radicals.
5. The compound of claim 4 wherein the acyl radicals are derived from an alkanoic acid of 3–20 carbon atoms.
6. The compound of claim 5 wherein the acid has 8–18 carbon atoms.
7. The compound of claim 1 wherein the initiator compound is water, an alkanol, alkenol, aralkanol, phenol, alkylene glycol or higher aliphatic polyol having up to 8 active hydrogen atoms.
8. The compound of claim 1 wherein n is not more than 3.

* * * * *

UNITED STATES PATENT AND TRADEMARK OFFICE
CERTIFICATE OF CORRECTION

PATENT NO. : 4,077,991
DATED : March 7, 1978
INVENTOR(S) : Violete L. Stevens; Arthur R. Sexton; Frederick P. Corson It is certified that error appears in the above-identified patent and that said Letters Patent are hereby corrected as shown below:

Column 1, line 42, "—$CH_2CHCH_2A$" should instead appear as -- —$CH_2\underset{|}{C}HCH_2A$ --.

Column 1, line 48, "—$CH_2CHCH_2OX$" should instead appear as -- —$CH_2\underset{|}{C}HCH_2OX$ --.

Column 1, line 63, "to combination" should instead appear as -- in combination --.

Column 3, line 9, "arysulfonic" should be spelled as -- arylsulfonic --.

Column 5, line 60, the word "Mose" should be spelled -- Most --.

Column 5, line 68, "product" should instead read -- products --.

Column 6, line 4, "typically" should instead read -- typical --.

Column 6, line 7, "commerical" should instead be spelled -- commercial --.

Column 6, in Table III, last line just before the "25" should appear the symbol -- $>$ --.

UNITED STATES PATENT AND TRADEMARK OFFICE
CERTIFICATE OF CORRECTION

PATENT NO. : 4,077,991

DATED : March 7, 1978

Page 2 of 2

INVENTOR(S) : Violete L. Stevens; Arthur R. Sexton; Frederick P. Corson

It is certified that error appears in the above-identified patent and that said Letters Patent are hereby corrected as shown below:

Column 7, line 26, the word "carbons" should instead read -- carbon --.

Column 8, line 32, "—$CH_2CHCH_2A$" should appear as -- —$CH_2\underset{|}{C}HCH_2A$ --.

Column 8, line 38, "—$CH_2, CH\ CH_2OX$" should appear as -- —$CH_2\underset{|}{C}HCH_2OX$ --.

Column 8, line 52, "—$CH_2, CHCH_2OX$" should appear as -- —$CH_2\underset{|}{C}HCH_2OX$ --.

Column 8, line 53, "X'" should appear as -- X's --.

Signed and Sealed this

Twenty-seventh Day of June 1978

[SEAL]

Attest:

RUTH C. MASON
*Attesting Officer*

DONALD W. BANNER
*Commissioner of Patents and Trademarks*